US005353402A

United States Patent [19]

Lau

[11] Patent Number: 5,353,402

[45] Date of Patent: Oct. 4, 1994

[54] COMPUTER GRAPHICS DISPLAY SYSTEM HAVING COMBINED BUS AND PRIORITY READING OF VIDEO MEMORY

[75] Inventor: Benny C. W. Lau, Thornhill, Canada

[73] Assignee: ATI Technologies Inc., Scarborough, Canada

[21] Appl. No.: 911,704

[22] Filed: Jul. 10, 1992

[30] Foreign Application Priority Data

Jun. 10, 1992 [CA] Canada ................................ 2070934

[51] Int. Cl.5 ................................ G06F 15/20

[52] U.S. Cl. ................................ 395/162; 365/230.05; 365/230.09; 345/185; 395/164

[58] Field of Search ................ 395/158, 162–166, 395/425; 364/DIG. 1, DIG. 2; 365/230.05, 189.12, 189.01, 230.09; 340/750, 723, 798–900; 345/185, 188, 197, 199

[56] References Cited

U.S. PATENT DOCUMENTS 4,953,101 8/1990 Kelleher et al. .................... 364/900

5,210,639 5/1993 Redwine et al. .................... 395/425

*Primary Examiner*—Dale M. Shaw

*Assistant Examiner*—Kee M. Tung

*Attorney, Agent, or Firm*—Antonelli, Terry, Stout & Kraus

[57] ABSTRACT

A display memory having a DRAM port and a serial port, a video controller including a host graphics controller having a bus port, a lookup table and a digital-to-analog converter for receiving lookup table data from the lookup table and converting it into signals reproducible by a display, the DRAM and serial ports being multiplexed to a combined bus, the combined bus being connected to the bus port of the graphics controller, the lookup table having an input for receiving data from the combined bus, apparatus for causing passage of serial data along the bus from the display memory in higher priority than any other data for provision of display data to the lookup table whereby the lookup table can provide the lookup table data to the digital-to-analog converter.

12 Claims, 3 Drawing Sheets

COMPUTER GRAPHICS DISPLAY SYSTEM HAVING COMBINED BUS AND PRIORITY READING OF VIDEO MEMORY

FIELD OF THE INVENTION

This invention relates to video display controllers for personal computers.

BACKGROUND TO THE INVENTION

Video display controllers for personal computers convert data from a main central processing unit to pixel elements for display on e.g. cathode ray tube. Such subsystems typically involve use of a VRAM for storage of pixel data for the display, a graphics controller, a colour lookup table and a digital-to-analog converter for converting the digital display signals into analog signals which can be displayed by the cathode ray tube.

In order to reduce the cost of such systems, it has been an objective to create a video controller on a single chip. However this has increased the number of pins through which data must be transferred into and out of the video controller, which is costly.

In order to reduce the number of pins which must be serviced by the internal controller, in one design parts of the video controller have been moved off the chip. While this achieved the objective of reducing the pin count, it required the use of a separate chip containing logic for interfacing the VRAM display memory, and increased the parts count and thus the cost due to the inability to integrate the entire video controller on a single chip.

SUMMARY OF THE PRESENT INVENTION

The present invention allows the video controller to be integrated into a single chip, yet reduces the number of pins required on the chip, and achieves nearly similar performance as the multi-chip structure. This is achieved by multiplexing both the data and serial buses of the VRAM on a single combined bus, and causing a memory interface controller in the video controller to give maximum priority to requests for reading of display data from the VRAM, i.e. reading of the VRAM via the serial port of the VRAM to the combined bus.

In accordance with an embodiment of the invention a graphics display system for a computer is comprised of a display memory having a DRAM port and a serial port, a video controller including a graphics controller having a bus port, a lookup table, and a digital-to-analog converter for receiving lookup table data from the lookup table and converting it into signals reproducible by a display, the DRAM and serial ports being multiplexed to a combined bus, the combined bus being connected to the bus port of the graphics controller, the lookup table having an input connected to the combined bus for receiving data from the display memory, and apparatus for causing passage of serial data along the bus from the display memory in higher priority than any other data for provision of display data to the lookup table whereby the lookup table can provide the lookup table data to the digital-to-analog converter.

In accordance with another embodiment of the invention, a graphics display system for a computer is comprised of a VRAM display memory having a DRAM port and a serial port connected in parallel to a combined bus, apparatus for demanding access to the VRAM, apparatus in response to various ones of the demands for always giving priority to the demand for reading of display data from the VRAM and application of the display data to the bus for subsequent processing and display.

BRIEF INTRODUCTION TO THE DRAWINGS

A better understanding of the invention will be obtained by reference to the detailed description below, in conjunction with the following drawings, in which.

DETAILED DESCRIPTION OF THE INVENTION

Figure 1:
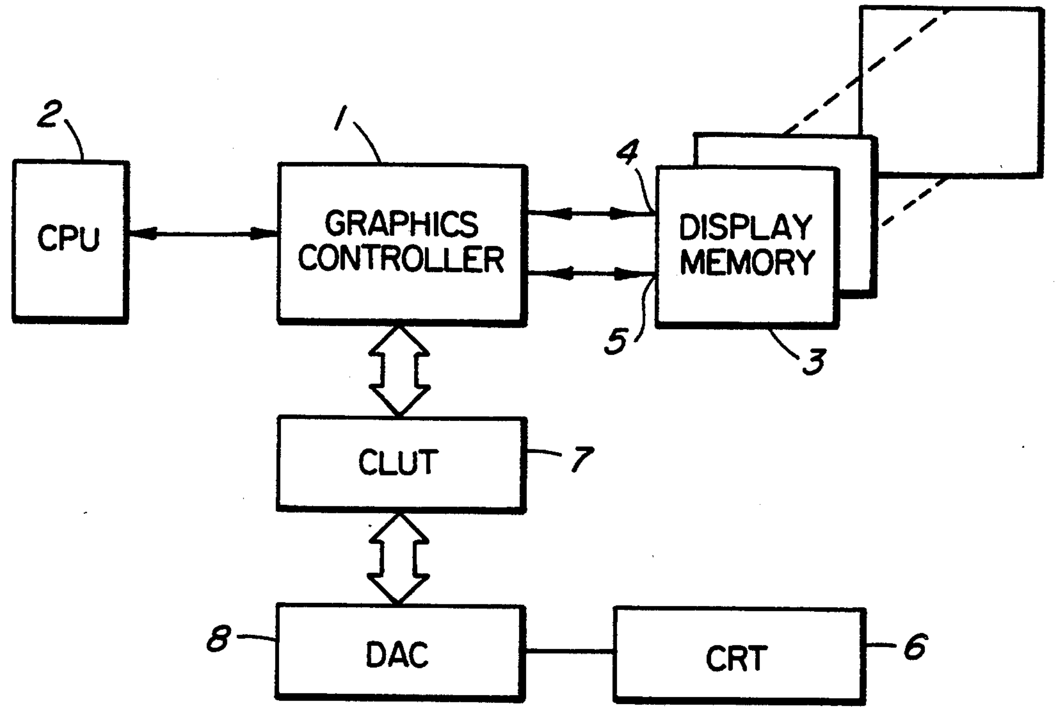
PRIOR ART FIG. 1
FIG. 1 is a block diagram of prior art video controlling architecture using a single chip video controller.

FIG. 1 illustrates in block diagram a typical graphics display subsystem used in an IBM TM compatible personal computer. A graphics controller 1 interfaces with a computer system processor 2 which instructs the graphics controller to write to or read display data from a display memory 3. The display memory has a data port 4 and a serial port 5 which can be used independently.

While both ports can be used to read and write data, typically the serial port is used to output data stored in the display memory to the graphics controller which converts that data into display signals for display on a CRT screen 6. Data stored in the display memory is used to access a colour lookup table CLUT 7, the digital output signal of which is converted to analog signals applied to digital-to-analog converter 8 for presentation to the CRT 6 display.

Due to the close integration of the lookup table 7, digital-to-analog converter 8 and graphics controller 1, it is sometimes implemented in a single chip. However in order to achieve a 1,208×1,024 pixel×256 colour 70 Hz refresh display with reasonable performance, it has been found that a minimum 32 bit wide data path is needed for both the DRAM port and the serial port; a total of 64 pins must be devoted to interface the graphics controller with the display memory. This has been found to be costly and as noted earlier graphics controller performance suffers when signals on 64 pins must be dealt with.

Figure 2:
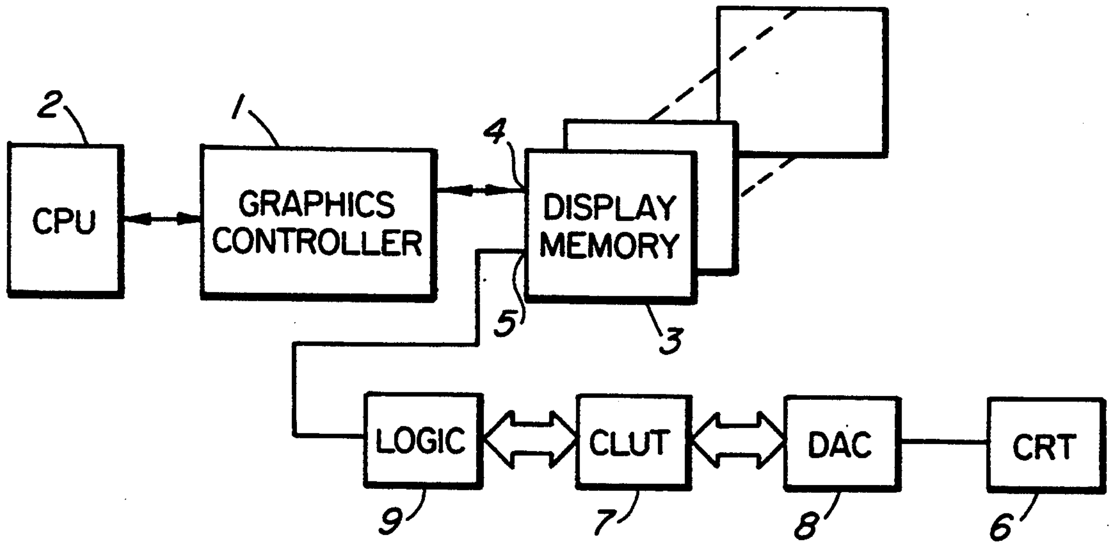
PRIOR ART FIG. 2
FIG. 2 is a block diagram of prior art video controlling architecture using a multi-chip video controller,.

In order to reduce the number of pins used in the graphics controller, the architecture shown in FIG. 2 has been used. In this case the graphics controller 1 interfaces the display memory 3 only via the DRAM port 4, and not via the serial port, and also does not interface the CRT. Instead, a separate logic circuit 9 is used, which controls interfacing of the colour lookup table 7 with the serial port 5 of the display memory 3. The colour lookup table interfaces the digital-to-analog converter 8, and converter 8 interfaces the cathode ray tube 6, as described earlier.

In the system shown in FIG. 2, the graphics controller chip need only have 32 pins interfacing the VRAM data port, and can operate faster. Thus this is the preferred architecture for a very high performance graphics system. However because of the separation of logic 9, lookup table 7 and digital-to-analog converter 8, single chip implementations are precluded.

A typical display memory 3 is described in the product data sheet from Toshiba MOS Memory Products, referring to memory types TC524256P/Z/J-10 and TC524256P/Z/J-12. The graphics architecture in accordance with the prior art is also described in the textbook "GRAPHICS PROGRAMMING FOR THE 8514/A" by Jake Richter and Bud Smith, published by M & T Publishing Inc., Redwood City, Calif., Copyright 1990, architecture and memory organization being shown for example on pages 190 and 191. Similarly other structures such as the lookup table and other operational details of the graphics controller are described in that text.

The present invention has been found to provide performance levels close to the architecture of FIG. 2, but can be implemented using a single chip, with only a 32 pin port interface to the VRAM. The basic structure is shown in FIG. 3.

Figure 3:
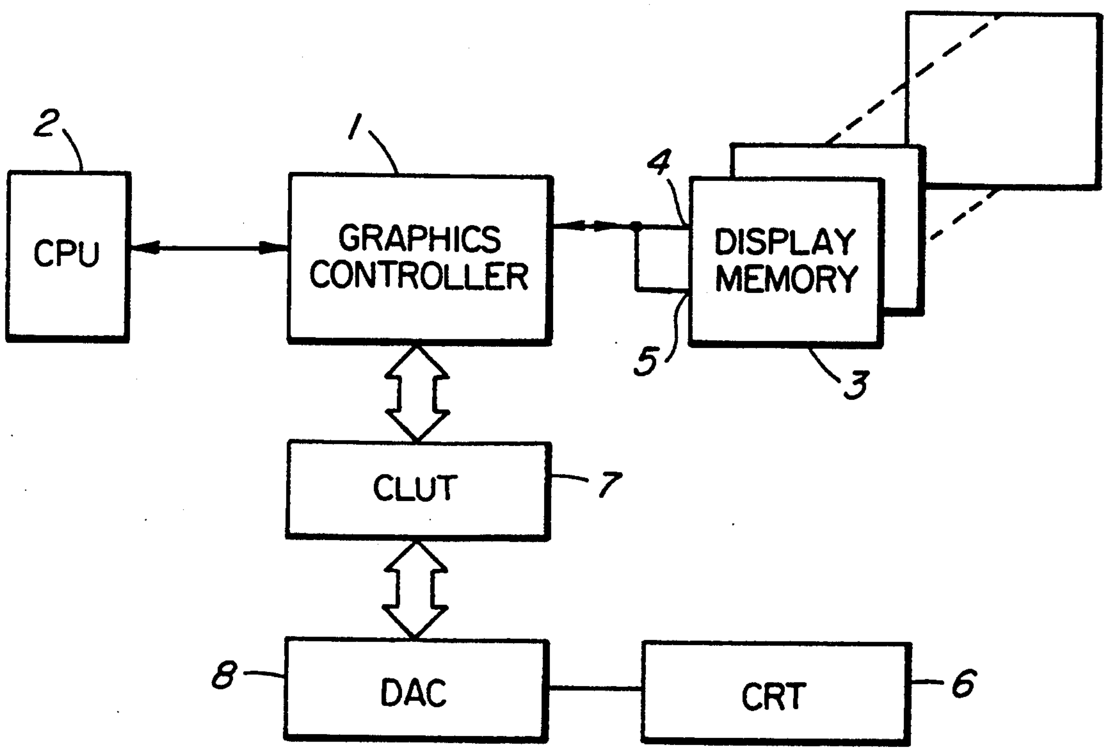
FIG. 3 is a block diagram of video controlling architecture in accordance with the present invention.

As shown in FIG. 3, the graphics controller 1 interfaces the display memory 3 only via its data port, as it would in the architecture of FIG. 2. However it also interfaces the colour lookup table 7 and digital-to-analog converter 8 as in the single chip implementation of FIG. 1.

Rather than having separate paths between the graphics controller and the serial port 5 of the display memory as in the prior art structure of FIG. 1, the serial port terminals of the display memory 3 are connected in parallel with its DRAM port terminals, and the data port bus connected to the DRAM port 4 is shared with the serial bus. The DRAM port timing is interleaved with the serial port timing, as will be described below.

Figure 4:
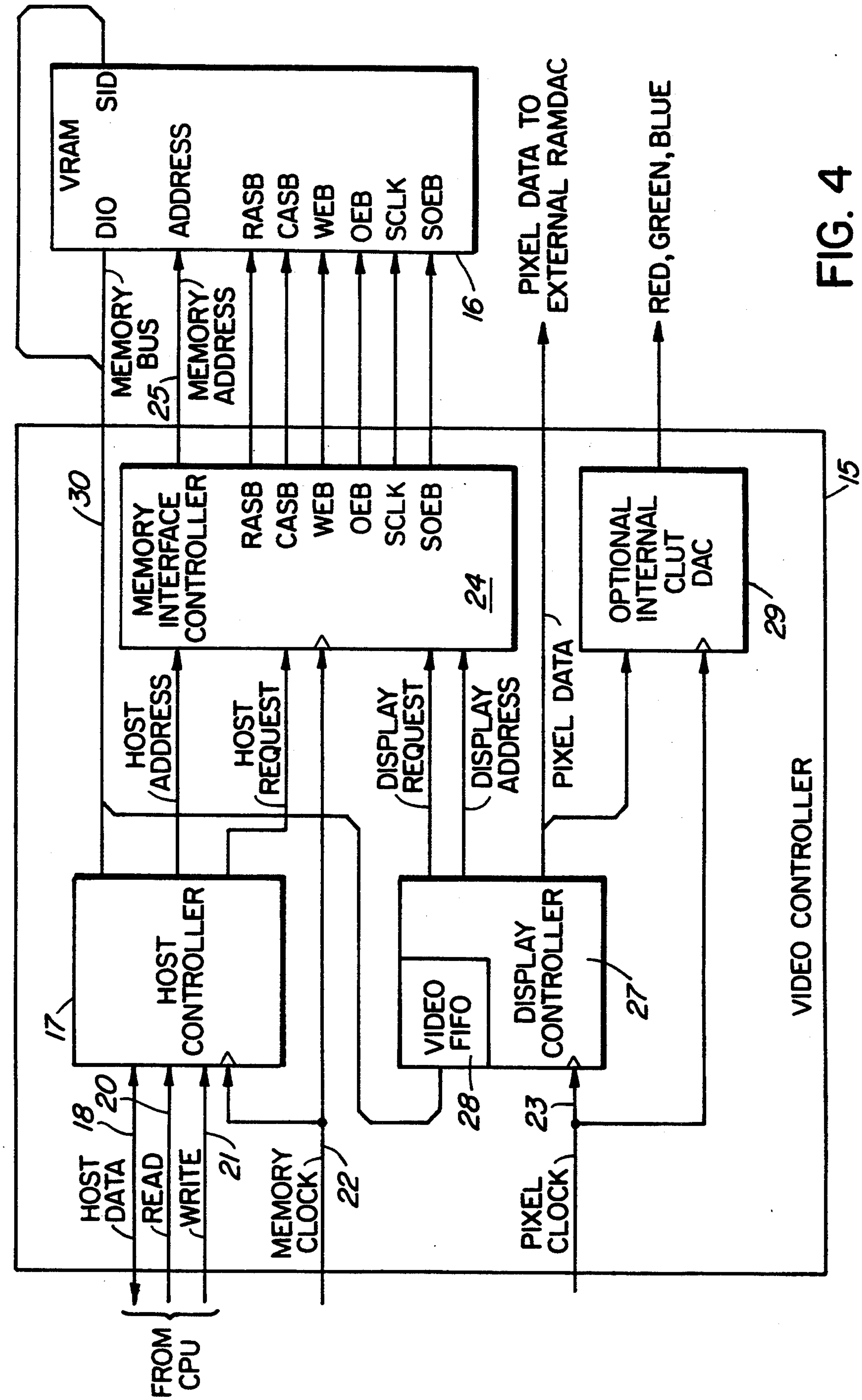
FIG. 4 is a more detailed block diagram of a video controller and VRAM in accordance with the present invention.

FIG. 4 illustrates the graphics controller and associated apparatus and its interface to the VRAM display memory in more detail.

The graphics controller and ancillary apparatus is shown as block 15, while the display memory, referred to earlier by reference numeral 3, is shown as VRAM 16.

The video controller is comprised of a host controller 17 which interfaces the computer CPU via a two-way host data bus 18 and receive read and write lines 20 and 21. It also receives from the main computer memory clock signals on a memory clock line 22 and pixel clock signals on a pixel clock line 23. A memory interface controller has an address output bus 25 which is connected to the address inputs of VRAMs 16. In the Toshiba memory product noted above, the memory address bus has nine lines A0–A8.

The memory interface controller 24 also has RASB, CASB, WEB, OEB, SCLK and SDBS output lines which connected to corresponding inputs of VRAM 16. A display controller 27 includes a video FIFO, and a display request output and a display address bus are connected to inputs of memory interface controller 24. An output pixel data bus of display controller 27 provides pixel data either to an external RAMDAC, or to an internal colour lookup table and digital-to-analog converter which has as its output, analog signals for provision to a CRT for display of red, green and blue pixels. The memory clock is applied to host controller 17 and to memory interface controller 24 and the pixel clock 23 is applied to display controller 27 and to the internal colour lookup table and digital-to-analog converter 29.

In accordance with the present invention the serial bus pins of VRAM 16, shown at VRAM port SIO are connected directly to corresponding pins of the parallel data bus port DIO of VRAM 16. This combined parallel and serial bus 30 is connected to host controller 17, and also to the input of FIFO 28.

In a typical prior art video display system which uses a dual port memory device VRAM of the Toshiba type described above as a video data storage medium, the host controller generates the video data and stores it in the VRAM via the parallel data port DIO of the VRAM. The video data is retrieved from the serial port of the VRAM by the display controller, and is sent to a video digital-to-analog converter, which accesses a colour lookup table and converts the input video into red, green and blue signals which are used by the CRT monitor for display. The nature of the VRAM is such that the data port and serial port can be operated assynchronous to each other, allowing the host controller to utilize the bandwidth of the data port exclusively.

In accordance with the present invention, however, since the serial and data port pins of the VRAM are joined together (externally) and are connected to the video controller via one combined memory bus, the memory interface controller 24 prioritizes the retrieval of the display data from the VRAM and any other requests from the host controller. The display request is given higher priority than other host request signals, and the memory interface controller generates memory control signals to the VRAM to start a memory cycle.

The video FIFO 28 in the display controller is used to store video data received from the serial port of the VRAM 16. A video display frame is comprised of an active display interval and a non-active display (blanking) interval. Prior to the start of an active display interval, i.e. during the blanking interval, the display controller 27 generates a display address and issues a display request to the memory interface controller 24. This is given highest priority by the memory interface controller to any other requests. The memory interface controller initiates a serial transfer cycle and uses the display address as the VRAM's memory address input via memory address bus 25. The memory interface controller also disables the VRAM data port output enable by applying a mark on the OEB line, and enables the serial port output signal by applying a space to the SOEB line. It then pulses the serial clock signal, thus shifting the video data out of the serial port SIO of the VRAM 16 to the combined bus 30. The video data read from VRAM 16 is stored in the video FIFO 28 in the display controller 27. When the FIFO 28 is full, the display controller 27 deactivates the display request signal to the memory interface controller. The memory interface controller may then respond to requests from the host controller 17 e.g. to write data to the VRAM via bus 30 and data port DIO.

During the active display interval, the video data stored in the FIFO 28 is read by the display controller 27 and is converted into pixel data for display. This is either output to an external RAMDAC or is applied to the internal colour lookup table and digital-to-analog converter 29 in the normal manner.

When the amount of stored video data in FIFO 28 has been consumed below a predetermined level, display controller 27 detects this and activates a display request signal to memory 24, in order to request more video data to be read from VRAM 16.

As noted above, when the display request from display controller 27 is inactive, any pending host request is serviced by the memory interface controller 24. When this occurs, the memory interface controller disables the serial port output enable by placing a mark on the SOEB line, and services the host request via the data port DIO of the VRAM 16.

It should be noted that the VRAM 16 supports two types of cycles, a non-page cycle and a page cycle, for reading from and writing to the data port DIO. A non-page cycle is used if the current ROW address in the memory matrix is not the same as the previous ROW address. Otherwise a page cycle can be used if the current row address is the same as the previous row address. It has been found that the non-page cycle is about 3.5 times longer than the page cycle.

The timing of the RASB and CASB signals select the type of cycle used. Since in this invention only the output enables of the data port and serial port are used to multiplex the memory bus, if the host is performing a series of page cycle accesses to the data port and a display request occurs, the memory interface controller 24 can service the display request but still maintain the RASB and CASB signals in page cycle. When the display request is completed, the memory interface controller can continue to service the host request in page cycle.

With the structure described herein, with a single chip video controller but with reduced pin count, speed almost as high as the very high performance graphics system described with reference to the prior art structure of FIG. 2 is achieved, and a high performance but significantly reduced cost graphics display subsystem is made available to personal computers.

A person understanding this invention may now conceive of alternative structures and embodiments or variations of the above. All of those which fall within the scope of the claims appended hereto are considered to be part of the present invention.

I claim:

1. A graphics display system for a computer comprising:

(a) a display memory having a dynamic random access memory (DRAM) port and a serial port,
(b) a video controller including a host graphics controller having a bus port, a lookup table and a digital-to-analog converter for receiving lookup table data from the lookup table and converting it into signals reproducible by a display, and a register means for receiving said data as serial data from the serial port of the display memory on said combined bus and for providing said data to the lookup table,
(c) the DRAM and serial ports being multiplexed to a combined bus, the combined bus being connected to the bus port of the host graphics controller,
(d) the lookup table having an input for receiving data from the combined bus,
(e) means for causing passage of serial data along the bus from the display memory in higher priority than any other data for provision of display data to the lookup table whereby said lookup table provides said lookup table data to the digital-to-analog converter.

2. A graphics display system as defined in claim 1, in which the video controller further includes a display controller which includes said register means as a FIFO register.

3. A graphics display system as defined in claim 2 in which said means for causing passage is a memory interface controller for receiving requests to access the display memory from the host graphics controller and from the display controller, and in response thereto, for enabling the display memory to output serial data to the display controller in higher priority than said requests from the graphics controller.

4. A graphics video display system as defined in claim 3 in which the DRAM and serial ports of the display memory are connected together.

5. A graphics display system for a computer comprising:

(a) a video random access memory (VRAM) display memory having a dynamic random access memory (DRAM) port and a serial port multiplexed to a combined bus,
(b) means for demanding access to said VRAM display memory,
(c) means in response to various ones of said demands, for always giving priority to memory accesses resulting from the demand for reading of display data from said VRAM display memory and application of the display data to said bus for subsequent processing and display.

6. A graphics display system as defined in claim 5, in which said priority giving means is comprised of a memory interface controller for receiving demands from plural sources and for enabling reading of said VRAM display memory to provide serial data to the combined bus starting from a particular VRAM address.

7. A graphics display system as defined in claim 6, wherein the memory interface controller controls reading from and/or writing to the VRAM display memory via the DRAM port in a page cycle mode in the event a current VRAM ROW address therein is the same as an immediately preceding VRAM ROW address, and otherwise in a non-page cycle mode.

8. A graphics display system as defined in claim 6, wherein the memory interface controller controls reading from and/or writing to the VRAM display memory via the DRAM port in a page cycle mode, and after interruption to service a display request via the serial port, maintains and continues the page cycle mode via the DRAM port.

9. A graphics display system as defined in claim 6 further including a display controller for controlling and monitoring a FIFO register, an input of the FIFO being connected to the combined bus for receiving said serial data, the display controller also for determining a remaining level of data as yet unread in the FIFO register, and for providing a demand for the reading of display data to the memory interface controller in the event said remaining level of data is at or below a predetermined level.

10. A graphics display system as defined in claim 9 in which said demand for the reading of display data occurs during a display blanking interval.

11. A graphics display system as defined in claim 10, further including a lookup table for receiving data from the FIFO register, for using the received data from the FIFO to look up pixel data therein, a digital-to-analog converter for receiving said pixel data and for providing analog signals to a display for display thereon.

12. A graphics display system as defined in claim 9, including a host controller connected to receive data and instructions from a computer central processor, the host controller having a data port connected to the combined bus and including means for providing demands for access to the VRAM to the memory interface controller.

* * * * *